(12) United States Patent
Neddermeyer, III

(10) Patent No.: US 7,907,372 B1
(45) Date of Patent: Mar. 15, 2011

(54) SYSTEMS AND METHODS FOR REDUCING LEAKAGE CURRENT HAZARDS USING AN ACTIVE SHUNT FILTER

(75) Inventor: Robert N. Neddermeyer, III, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 80 days.

(21) Appl. No.: 12/330,984

(22) Filed: Dec. 9, 2008

(51) Int. Cl.
*H02H 3/00* (2006.01)
*H02H 9/08* (2006.01)
(52) U.S. Cl. .................. 361/42; 361/43; 361/45; 361/49
(58) Field of Classification Search .................. 361/42
See application file for complete search history.

(56) References Cited

U.S. PATENT DOCUMENTS 6,388,451 B1 * 5/2002 Burba et al. .................. 324/522

* cited by examiner

*Primary Examiner* — Dharti H Patel
(74) *Attorney, Agent, or Firm* — Hamre, Schumann, Mueller & Larson, P.C.

(57) ABSTRACT

A system for reducing leakage current hazards is provided. The system includes an electronic component, an active shunt filter and a power source. The electronic component has a first component terminal coupled to a phase line and a second component terminal coupled to a ground. The active shunt filter device is coupled in parallel to the electronic component and has a first device terminal coupled to the phase line and a second device terminal coupled to the ground. The power source is coupled to the electronic component and the active shunt filter device via the phase line and the ground. The active shunt filter device monitors leakage currents generated by the electronic component and sets an impedance value to force any leakage currents from the ground to the phase line.

20 Claims, 1 Drawing Sheet

US 7,907,372 B1

SYSTEMS AND METHODS FOR REDUCING LEAKAGE CURRENT HAZARDS USING AN ACTIVE SHUNT FILTER

FIELD

This disclosure relates to the field of electronics. More particularly, this description relates to systems and methods for reducing leakage currents of electronic enclosures.

BACKGROUND

It is common in many military and commercial applications to have electronic enclosures for storing a number of electronic components, particularly commercial off the shelf ("COTS") devices. These electronic enclosures may be in the form of a console, a cabinet, a rack, etc., depending on the types of COTS devices being stored and the environment where the electronic enclosures are located. Typical electronic enclosures are also connected to a power source for supplying power to the electronic components stored by the enclosure.

A typical problem associated with electronic components such as COTS devices and electronic enclosures are leakage currents that result in potential shock hazards. A leakage current is defined as any current that conducts along exposed conductive surfaces and through the protective ground conductor of an electronic component or enclosure. Leakage currents are typically generated by filtering components and parasitic elements within an electronic component that circulate a current back to the power source via ground. COTS devices are typically required to adhere to Underwriters Laboratories ("UL") leakage current limits of 3.5 mA. Similarly, electronic enclosures that store electronic components are typically required to adhere to leakage current limits of 3.5-21 mA, depending on the enclosure being used. A problem associated with storing a number of COTS devices in an electronic enclosure is that the leakage currents produced by the individual devices are accumulated by the electronic enclosure, thereby generating a high enclosure leakage current that is above the specified limits.

Conventionally, several methods have been used to reduce leakage currents in electronic enclosures. One method is to select electronic components that generate less leakage current or limit the number of electronic components stored in the electronic enclosure. However, there may be limited options when choosing one electronic component over another, and simply reducing the number of electronic components stored in each enclosure results in requiring more enclosures. Another method is to power an enclosure and the electronic components therein using multiple cables connecting the enclosure to the power source. This allows the user to distribute generated leakage current amongst the different circuits. However, providing more power cables to the enclosure merely transfers the leakage current risks from the enclosure to the power source powering the enclosure. Yet another method is to use an isolation transformer to provide a high impedance element in the leakage current loop path. However, isolation transformers contribute significant weight and take up a significant amount of space in the electronic enclosures. Also, the use of an isolation transformer in an electronic enclosure increases the costs of the enclosure as well.

Accordingly, there is a need for improved devices and methods for successfully reducing leakage currents that is low weight, takes limited space, and is inexpensive without simply shifting leakage current risks to another location.

SUMMARY

This application describes systems and methods for reducing leakage currents using an active shunt filter.

In one embodiment, a system for reducing leakage current hazards is provided. The system includes an electronic component, an active shunt filter and a power source. The electronic component has a first component terminal coupled to a phase line and a second component terminal coupled to a ground. The active shunt filter device is coupled in parallel to the electronic component and has a first device terminal coupled to the phase line and a second device terminal coupled to the ground. The power source is coupled to the electronic component and the active shunt filter device via the phase line and the ground. The active shunt filter device monitors leakage currents generated by the electronic component and sets an impedance value to force any leakage currents from the ground to the phase line.

In another embodiment, a device for reducing leakage current hazards in an electronic enclosure housing an electronic component is provided. The device includes a control part and a switching part. The control part monitors leakage currents generated by the electronic component and depending on the amount of leakage current, generates switching instructions. The switching part receives switching instructions from the control part and based on the switching instructions sets an impedance value to force any leakage currents to circulate within the electronic enclosure.

In yet another embodiment, a method for reducing leakage current hazards using an active shunt filter device is provided. The method includes monitoring leakage currents generated by an electronic component using a control part of the active shunt filter device. The method also includes setting an impedance value of the active shunt filter device based on the monitored leakage currents using a switching part of the active shunt filter device, and forcing any leakage currents to travel from a ground line to a phase line via the active shunt filter device.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized without departing from the spirit and scope of the claims. The following detailed description is, therefore, not to be taken in a limiting sense.

Figure 1:
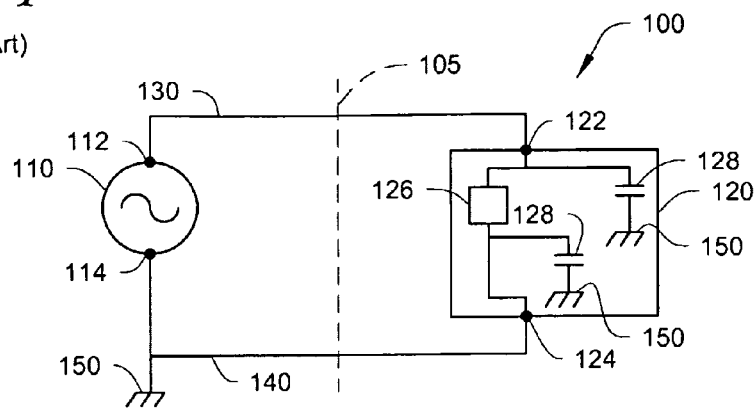
FIG. 1 is a prior art circuit diagram illustrating one embodiment of how leakage currents are generated in an electronic component, and consequently in an electronic enclosure.

FIG. 1 is a prior art circuit diagram illustrating one embodiment of how leakage currents are generated in an electronic component, and consequently in an electronic enclosure. As shown in FIG. 1, a circuit 100 includes a power source 110 with a first terminal 112 coupled to a first terminal 122 of an electronic component 120 via a phase line 130 and a second terminal 114 coupled to a second terminal 124 of the electronic component 120 via a neutral line 140 that is connected to a ground 150. The electronic component 120 is housed in an electronic enclosure, represented by the dashed line 105.

The electronic component 120 can be any commercial off the shelf electronic component or a specially designed electronic component. Regardless, the electronic component 120, for illustrative purposes, shows a load 126 and a pair of filtering elements 128. The load 126 is connected at one terminal to the phase line 130 via the first terminal 122, and connected at its other terminal to the neutral line 140 via the second terminal 124. One of the filtering elements 128 is connected at one terminal to the phase line 130 via the first terminal 122, and connected at its other terminal to the ground 150. The other filtering element 128 is connected at one terminal to the neutral line 140 via the second terminal 124, and connected at its other terminal to the ground 150. The filtering elements 128 can be, for example, a filter capacitor, a parasitic element, etc. When the power source 110 is activated, some of the current traveling through the phase line 130 to the electronic component 120 is sent to one of the filtering elements 128 and some of the current traveling through the electronic component 120 to the neutral line 140 is sent to the other filtering element 128. This causes a leakage current to be sent out of the filtering elements 128 to the ground 150 and ultimately back to the second terminal 114 of the power source 110, which results in leakage currents conducting through exposed conductive surfaces on the outside of the enclosure 105 as the leakage currents travel to the power source 110.

Figure 2:
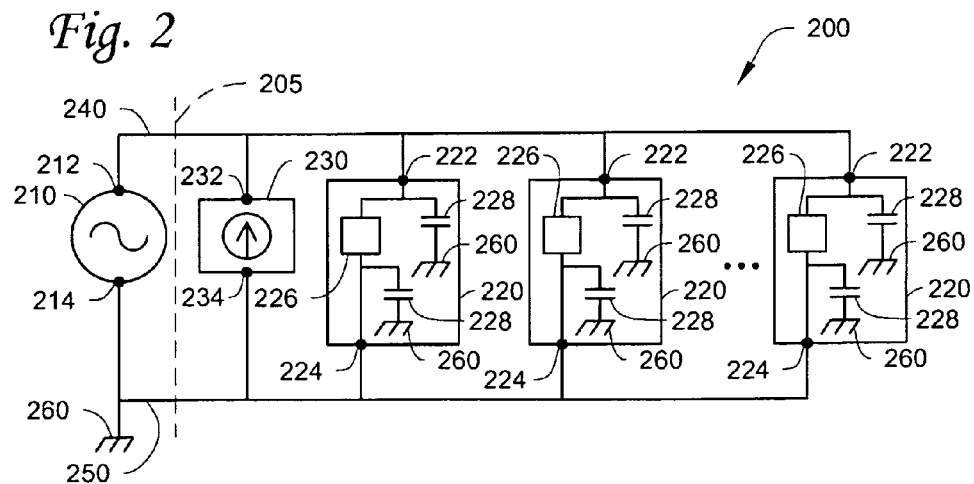
FIG. 2 is a circuit diagram illustrating one embodiment of decreasing leakage currents generated by a plurality of electronic components using an active shunt filter device.

FIG. 2 is a circuit diagram illustrating one embodiment of decreasing leakage currents generated by a plurality of electronic components 220 using an active shunt filter device 230. The electronic components 220 and the active shunt filter device 230 are housed in an electronic enclosure, represented by the dashed line 205. The electronic enclosure may be, for example, a console, a cabinet, a rack, etc. that is capable of holding numerous electronic components, including the electronic components 220. While FIG. 2 shows the active shunt filter device 230 decreasing leakage currents generated by multiple electronic components 220 housed in the enclosure 205, the active shunt filter device 230 can also be used to decrease leakage currents generated by a single electronic component housed in the enclosure 205. Also, while FIG. 2 shows the active shunt filter device 230 used in a single phase power arrangement, the same active shunt filter device 230 can be used in a three-phase power arrangement to decrease leakage currents generated by one or more electronic components housed in the enclosure 205.

The circuit 200 also includes a power source 210 located outside of the electronic enclosure 205 with a first terminal 212 coupled to a first terminal 222 of the electronic components 220 and a first terminal 232 of the active shunt filter device 230 via a phase line 240. The second terminal 214 of the power source 210 is coupled to a second terminal 224 of the electronic components 220 and a second terminal 234 of the active shunt filter device 230 via a neutral line 250 that is connected to a ground 260. Each of the electronic components 220, for illustrative purposes, shows a load 226 and a pair of filtering elements 228. The load 226 is connected at one terminal to the phase line 240 via the first terminal 222, and connected at its other terminal to the neutral line 250 via the second terminal 224. Within each electronic component 2220, one of the filtering elements 228 is connected at one terminal to the phase line 240 via the first terminal 222, and connected at its other terminal to the ground 260. The other filtering element 228 of each electronic component 220 is connected at one terminal to the neutral line 250 via the second terminal 224, and connected at its other terminal to the ground 260.

When the power source 210 is activated, leakage current generated by the filtering elements 228 and sent out to the ground 260 is monitored by the active shunt filter device 230. Then, based on the leakage current levels monitored, the active shunt filter device 230 alters its impedance value to force any leakage currents to circulate within the enclosure 205 as opposed to exposed conductive surfaces on the outside of the enclosure 205 as the leakage current travels to the power source 210. Concurrently, the active shunt filter device 230 also maintains a high impedance value for preventing current, generated by the power source 210 and traveling to the electronic components 220 via the phase line 240, from bypassing the electronic components 220 and going through the active shunt filter device 230 directly to the ground 260.

Figure 3:
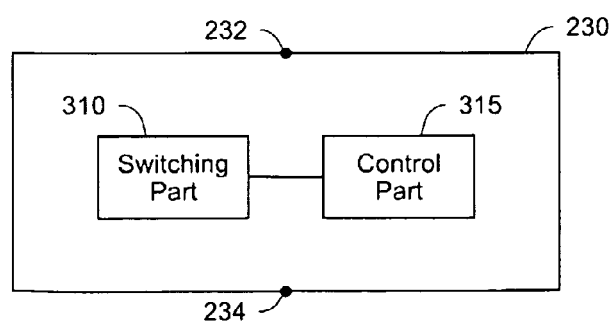
FIG. 3 is a block diagram of an active shunt filter device, according to one embodiment.

FIG. 3 is a block diagram of the active shunt filter device 230, according to one embodiment. The active shunt filter device 230 is similar to an active shunt filter device used to improve harmonics currents. The active shunt filter device 230 includes a part 310 connected to a control part 315. The part 310 is a circuit incorporating a switching or linear regulator control topology based on semiconductor switch elements such as, for example, bipolar junction transistors ("BJT"), metal-oxide semiconductor field-effect transistors ("MOSFET"), or insulated gate bipolar transistors ("IGBT"). The control part 315 monitors leakage current levels from the second terminal 234 generated by each electronic component 220. Depending on the monitored leakage current levels, the control part 315 generates switching instructions to be sent to the switching part 310. The switching instructions generated by the control part 315 are generated to create a low impedance path for leakage currents to force leakage currents to circulate from the ground 260 back up to the phase line 240 within the enclosure 205. The switching part 310 receives switching instructions from the control part 315 and based on the switching instructions sets the circuit located in the switching part 310 to set a low impedance path for currents traveling from the ground 260 to the phase line 240 via the active shunt filter device 230. The switching part 310 also maintains a high impedance value to prevent current traveling from the power source 210 to the electronic components 220 along the phase line 240 to bypass the electronic components 220 and travel immediately to the ground 260 via the active shunt filter device 230.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A system for reducing leakage current hazards comprising:
   an electronic component with a first component terminal coupled to a phase line and a second component terminal coupled to a neutral line;
   an active shunt filter device coupled in parallel to the electronic component with a first device terminal coupled to the phase line and a second device terminal coupled to the neutral line; and a power source coupled to the electronic component and the active shunt filter device with a source terminal coupled to the phase line;

wherein the active shunt filter device is configured to monitor leakage current generated by the electronic component and sets an impedance value to force any leakage currents from the neutral line to the phase line.

2. The system of claim 1, wherein the electronic component is located in an electronic enclosure and the active shunt filter device forces the leakage current to remain within the enclosure.

3. The system of claim 2, wherein the active shunt filter device is located in the electronic enclosure.

4. The system of claim 1, wherein the electronic enclosure is a console, a cabinet or a rack that is capable of holding a plurality of electronic components.

5. The system of claim 1, wherein the active shunt filter device is located in an electronic enclosure.

6. The system of claim 1, wherein the active shunt filter device includes:

a first part that monitors leakage current generated by the electronic component and depending on the amount of leakage current, generates instruction commands; and a second part connected to the first part that receives instruction commands from the first part and based on the instruction commands sets an impedance value to force any leakage current from the neutral line to the phase line via the active shunt filter device.

7. The system of claim 6, wherein the second part includes a semiconductor switching device.

8. The system of claim 7, wherein the semiconductor switching device is a bipolar junction transistor, an insulated-gate bipolar transistor or a metal-oxide semiconductor field-effect transistor.

9. The system of claim 1, wherein the active shunt filter device maintains a high impedance value for current traveling via the phase line to prevent the current from traveling via the active shunt filter device to the neutral line.

10. The system of claim 1, wherein the neutral line is connected to ground.

11. The system of claim 1, further comprising a plurality of electronic components each with a first component terminal coupled to a phase line and a second component terminal coupled to a neutral line, and the active shunt filter device is configured to monitor leakage current generated by each electronic component and sets an impedance value to force any leakage currents from the neutral line to the phase line.

12. The system of claim 1, wherein the active shunt filter device monitors leakage current levels generated by the electronic component via the second terminal.

13. A device for reducing leakage current hazards in an electronic enclosure housing an electronic component, the device comprising:

a first part that is configured to monitor leakage current generated by the electronic component and depending on the amount of leakage current, generates instruction commands; and a second part connected to the first part that is configured to receive instruction commands from the first part and based on the instruction commands the second part is configured to set an impedance value to force any leakage current to circulate within the electronic enclosure.

14. The device of claim 13, wherein the second part includes a semiconductor switching device.

15. The device of claim 14, wherein the semiconductor switching device is a bipolar junction transistor, an insulated-gate bipolar transistor or a metal-oxide semiconductor field-effect transistor.

16. The device of claim 13, wherein the device is configured to be electrically parallel to the electronic component.

17. The device of claim 13, wherein the electronic enclosure is a console, a cabinet or a rack that is capable of holding a plurality of electronic components, and the device is configured to be electrically parallel to each of the electronic components.

18. The device of claim 13, wherein the device is configured to be located within the electronic enclosure.

19. A method for reducing leakage current hazards in an electronic enclosure that houses an electronic component and an active shunt filter device, the method comprising:

monitoring leakage current generated by the electronic component housed within the electronic enclosure using a control part of the active shunt filter device housed within the electronic enclosure;

setting an impedance value of the active shunt filter device based on the monitored leakage current using a switching part of the active shunt filter device; and forcing any leakage current to travel from a neutral line to a phase line via the active shunt filter device, thereby forcing any leakage current to circulate within the electronic enclosure.

20. The method of claim 19, comprising connecting the active shunt filter device electrically parallel to the electronic component between the phase line and the neutral line.

* * * * *